Figure 1:
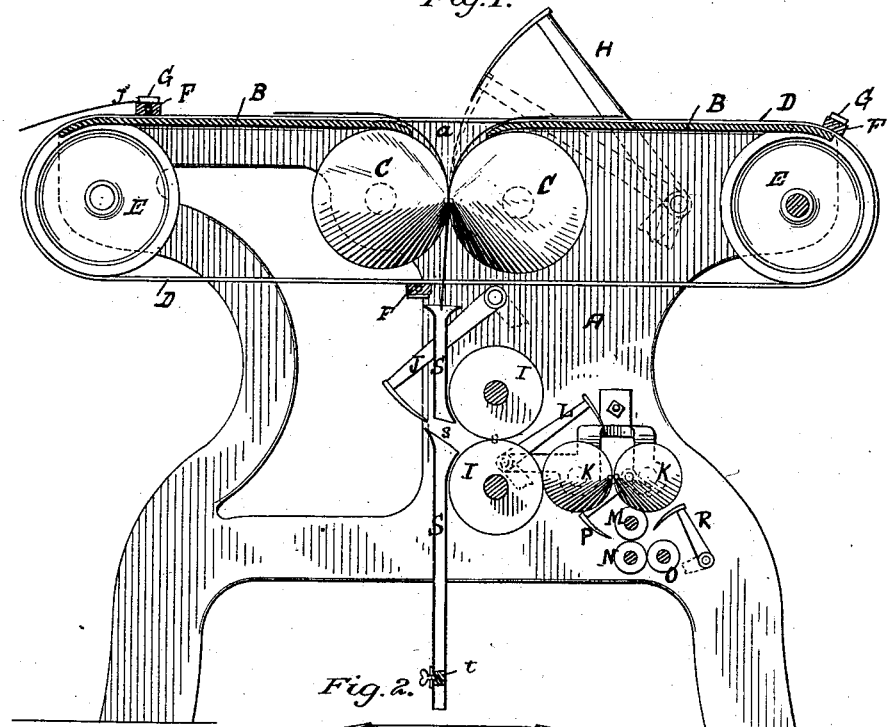

(No Model.) 4 Sheets—Sheet 1.

W. C. CROSS & E. B. STOCKING.
Folding Machine.

No. 240,390. Patented April 19, 1881.

Attest:
R. F. Barnes.
C. A. Dick.

Inventors:
Wm. C. Cross and
E. B. Stocking
by H. S. Bailey
Attorney (No Model.) 4 Sheets—Sheet 2.

W. C. CROSS & E. B. STOCKING.
Folding Machine.

No. 240,390. Patented April 19, 1881.

Attest:
R. F. Barnes.
E. A. Dick.

Inventors:
Wm. C. Cross and
E. B. Stocking
by M. Bailey, attorney (No Model.) 4 Sheets—Sheet 3.
W. C. CROSS & E. B. STOCKING.
Folding Machine.
No. 240,390. Patented April 19, 1881.
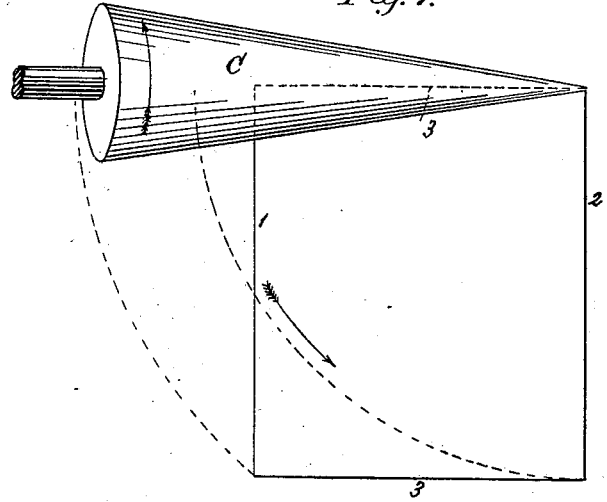
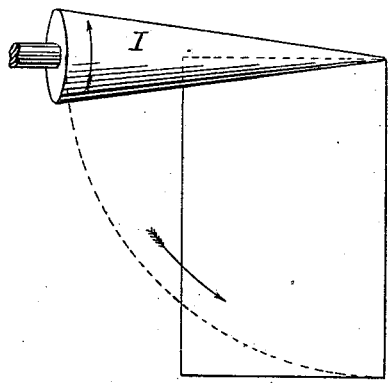
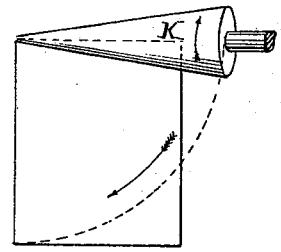
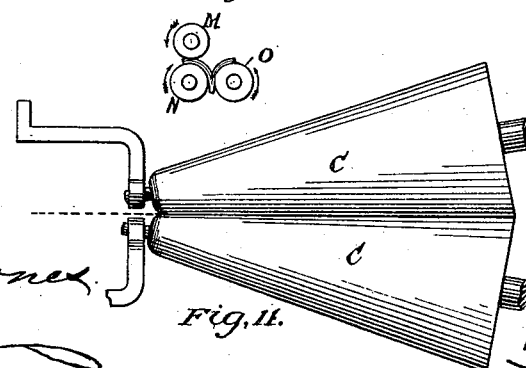

(No Model.) 4 Sheets—Sheet 4.
W. C. CROSS & E. B. STOCKING.
Folding Machine.
No. 240,390. Patented April 19, 1881.
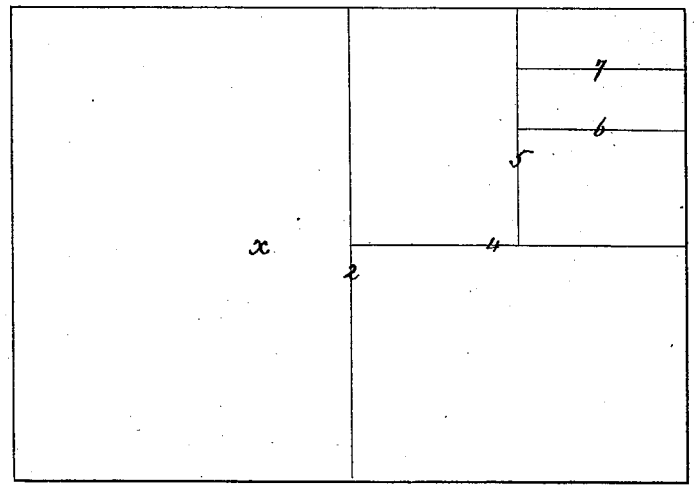
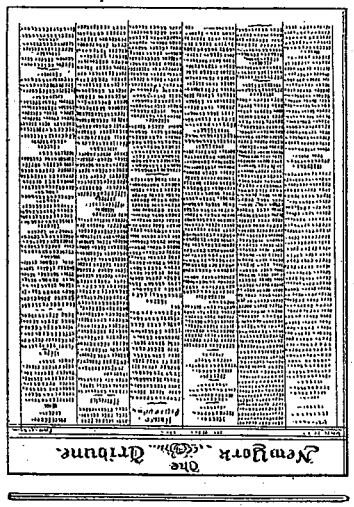
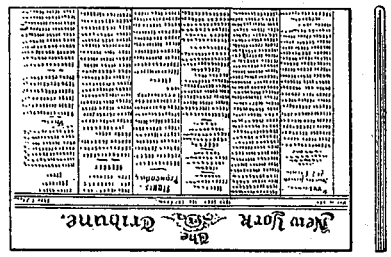
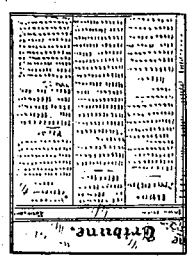
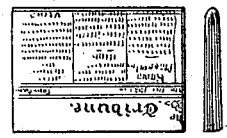
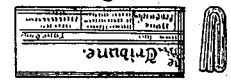
Attest:
R. F. Barney
E. F. Dick
Inventors:
Wm. C. Cross and
E. B. Stocking
by M. Davis
Attorney

UNITED STATES PATENT OFFICE.

WILLIAM C. CROSS, OF BOSTON, MASSACHUSETTS, AND EDGAR B. STOCKING, OF WASHINGTON, DISTRICT OF COLUMBIA.

FOLDING-MACHINE.

SPECIFICATION forming part of Letters Patent No. 240,390, dated April 19, 1881.

Application filed February 4, 1881. (No model.)

*To all whom it may concern:*

Be it known that we, WILLIAM C. CROSS, of Boston, Massachusetts, and EDGAR B. STOCKING, of Washington, District of Columbia, have invented certain new and useful Improvements in Method of and Machinery for Folding Paper and other Material, of which the following is a specification.

Heretofore, in apparatus for folding paper, it has been customary to employ cylindrical rolls in conjunction with a tucker-blade, or some equivalent instrumentality, to tuck the sheet or web into the bite of the said rolls. In order to make a cross-fold or a fold at right angles to the one previously made, it has been necessary to carry off the folded sheet by tapes or their mechanical equivalent and present it to other cylindrical rolls having their axes at right angles, or thereabout, to the axes of the first folding-rolls. Recently there has also been used for the purpose of folding the web or sheet a stationary sheet so bent and fashioned that the paper web or sheet as it is drawn over said plate will be folded.

It is our object to turn the sheet at the time it is folded, giving it a quarter-turn or thereabout, so that, for the time being, what were its side edges will become its ends, and what were its ends will become its side edges. One effective means for this purpose and that which we prefer in practice to employ is conical rolls, to be used, of course, in connection with a tucker for tucking the paper on the proper line of fold into the bite of the rolls. Theoretically, and to produce absolutely the best result, one end of the fold-line in the paper should, when the sheet is tucked into the bite of the rolls, coincide with the point of intersection of the axes of the cones, so that the paper at this point will have no movement, the folded sheet, which is fed by the conical rolls progressively faster as it departs from the said apex or point of intersection, swinging around on said point as a center, so that by the time it is ready to pass from between the conical rolls it will have described a quarter turn or circle. In practice, however, it is feasible to locate this end of the fold-line to one side or the other of the said point, although the further the departure in either direction from that point the less complete the reversal of the sheet.

The advantage of our improvement is that the whole apparatus is compact and comparatively inexpensive, and requires no tapes or conveyers, beyond the folding-rolls themselves, to carry the sheet from one set of folding-rolls to the other.

The nature of our invention and the manner in which the same is or may be carried into effect will be understood by reference to the accompanying drawings, in which—

Figure 2:
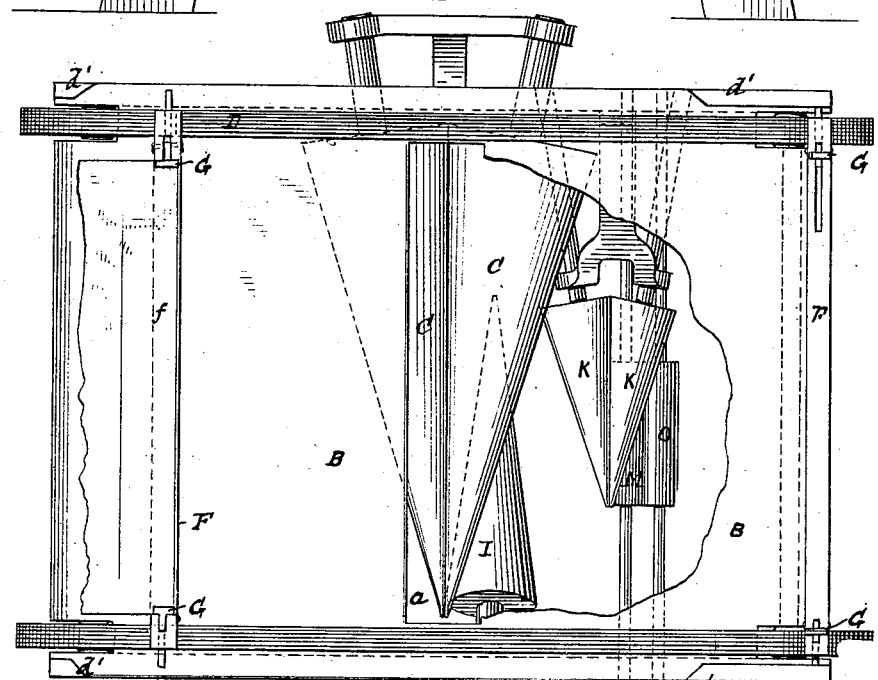
Figure 3:
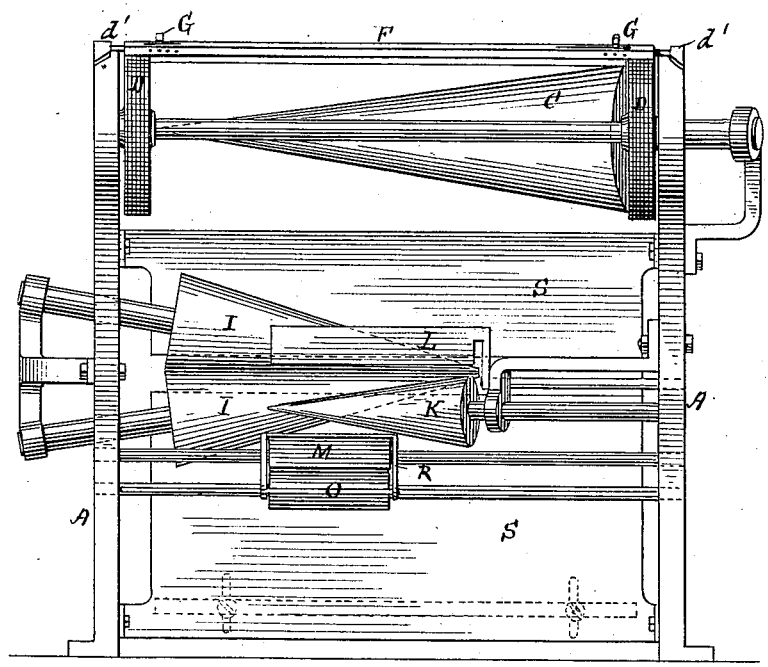
Figure 4:
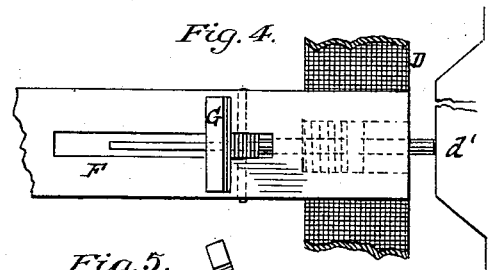
Figure 5:
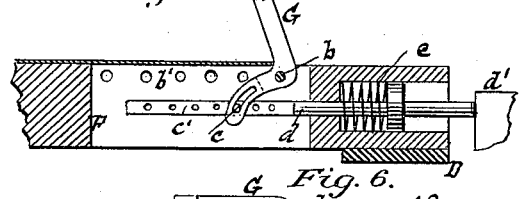
Figure 6:
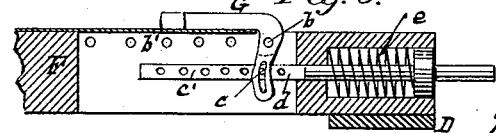

Figure 1 is a sectional side elevation of a folding-machine embodying our invention. Fig. 2 is a plan; and Fig. 3 is an end elevation of the same. Figs. 4, 5, and 6 are views, to be hereinafter referred to, on an enlarged scale of clamping mechanism, which may be used to carry the paper sheets to proper place on the folding-table. Figs. 7, 8, 9, 10 are diagrams representing the various positions successively assumed by the paper as it passes through the machine. Fig. 11 is a modification to be referred to. Fig. 12 is a plan of the paper sheet bearing the fold-lines on which it is successively folded. Figs. 13 to 17, inclusive, represent the paper as it appears after each successive fold is made.

A is the frame which supports the working parts of the machine.

B is the folding-table, provided with a central transverse opening, *a*, through which the paper sheet is tucked into the bite of the first set of folding-rolls C. These rolls, as shown, are conical, arranged horizontally beneath the opening *a* in the folding-table. They are power-driven, and are geared to move at the same peripheral speed. They are supported in elongated bearings at one end only, and taper to a point at the other end. This is not, however, a necessity, for they may, as shown in plan in Fig. 11, be truncated, and having bearings at each end, the bearings at their smaller ends being arranged in such manner as to permit the edge of the paper at that side to extend to the desired point.

In order to carry successive sheets to proper place on the folding-table, various devices may be employed. In some cases, when folding small sheets—such, for instance, as book or pamphlet sheets—the sheets might be fed by hand, in which case the table should be provided with proper guides and gages; but when used in connection with power printing-presses mechanism for feeding said sheets to place on the folding-table is requisite. The mechanism shown in the drawings consists of endless tapes D, running around and moved by power-driven pulleys or wheels E, the tapes running on top, just above the surface of the folding-table. These tapes carry clamp-bars F—three in number in this instance—which extend across from one tape to the other, and carry at each side or end a clamp, G. (Shown on enlarged scale in plan, Fig. 4, and in section in two positions in Figs. 5 and 6.) The clamp consists of a jaw pivoted at $b$ in a slot in the clamp-bar, and having its forked inner end straddling a pin, $c$, projecting laterally from a rod, $d$, adapted to slide in and out in the clamp-bar. The pivot $b$ and pin $c$ of one or both clamps are made adjustable, fitting in one or the other of holes $b'$ $c'$ in the bar F and rod $d$, respectively. In this way the clamps may be set nearer together or farther apart, as required by the exigencies of the work or the width of the paper to be operated on.

The outward movements of the rod which causes the closing of the clamp is induced by spring $e$, as shown in Fig. 6. Its inward movement, which raises the clamp, is caused by cams $d'$ on the frame of the machine, which act on the projecting end of the rod $d$ and force the latter in against the stress of the spring. There being three clamp-bars and sets of clamps, the tapes make one complete revolution for every three successive sheets delivered to them, being so timed that each clamp-bar, with clamps open, in turn comes up in position to receive on it the front end, $f$, of the sheet to be folded, as indicated in Fig. 2. As soon as the sheet is in this position on the bar the clamps close on it and carry it along until they bring it to the desired place on the folding-table, at which point the clamps rise and release the paper sheet, which is then acted on by the tucker, which may be a blast of air or any other known instrumentality used in folding-machines for this purpose. In this instance we use a power-driven vibratory tucking-blade, H, of the ordinary construction, whose movement is so timed that as soon as the paper is brought to the proper position under it and released by the clamps it will descend and tuck the paper into the bite of the revolving conical rolls beneath. When thus tucked between the rolls one edge of the paper sheet at the fold-line is at the point of intersection of the axes of the cones or thereabout. The conical rolls, when the paper is thus introduced between them, act not only to fold the sheet, but at the same time to turn it, as indicated in Fig. 7, so that by the time the sheet is ready to pass from the rolls the edges 1 and 2, (2 being the folded edge,) which, when the sheet started between the rolls, were at front and rear, will be at the sides relatively to the feed or direction of movement of the sheet through the machine, and the edges 3, which were at the sides, will be at front and rear.

The paper sheet, having thus been simultaneously folded and turned, is in position to be acted on by other folding mechanism, one arrangement of which, adapted for newspaper-folding, is shown in the drawings.

At a proper distance below the first set of conical rolls is a second set of like rolls, I, with a tucker-blade, J. These rolls are about two-thirds the length of the first, and are set one above the other instead of side by side. The center line of the folded sheet comes opposite the line of contact between these rolls just as the paper passes out from the first set of rolls. At this moment the blade J tucks the sheet between the rolls I, which fold and turn the sheet simultaneously, as indicated in Fig. 8.

Beyond rolls I is a third set of conical rolls, K, about two-thirds the length of rolls I, and a third tucker-blade, L; and beyond the rolls K are three cylindrical rolls, M N O, and two tucker-blades, P R, which make the two last folds. All the rolls and tucker-blades are power-driven, and are so positioned and timed and speeded as to make the proper fold at the proper time.

In the first set of rolls C, sheet $x$, Fig. 12, is folded along the line 2 and simultaneously turned so as to come out from said rolls and opposite the second set of rolls, in the position indicated in Fig. 7. It is then taken by the second set of rolls I, by which it is simultaneously folded along the line 4, Fig. 12, and turned, as indicated in Fig. 8. It is then taken by the third set of conical rolls K, which fold it on the line 5, Fig. 12, and turn it to the position shown in Fig. 9. It is then folded by the rolls M N on the line 6, Fig. 12, and by the final rolls N O on the line 7, Fig. 12.

The paper is represented after the first fold in Fig. 13, after the second fold in Fig. 14, after the third in Fig. 15, and after the fourth and fifth folds in Figs. 16 and 17.

In order to secure the proper presentation of the folded sheet to the succeeding set of folding-rolls, we can make use of a pocket formed of guide-plates S, Fig. 1, provided with an opening, $s$, for passage of the tucker-blade, and closed below by a vertically-adjustable bar, $t$, for properly bottoming the sheet in case it should be released from the one set of conical rolls before being taken by the other. This, however, is a nicety, not a necessity.

With a view to illustrating the nature of our invention, we have shown and described in detail one form of mechanism adapted to carry the same into effect. It is manifest, however, that various forms of machinery arranged to operate on the same principle may be employed.

With respect to the conical rolls we would remark that while we have shown them as combined with a tucker whereby they are caused to fold and turn the sheet simultaneously, the said rolls may be used without the tucker simply to receive a sheet already folded and to turn it, so as to present it to the succeeding folding-rolls, whether conical or cylindrical.

So far as we are aware conical rolls have never before been employed in folding-machines, either for folding and turning or for only turning the sheet. For instance, taking the conical rolls K as an illustration: At a proper distance above the rolls a folding mechanism might be employed, such as two cylindrical rolls and a tucker, from which rolls the folded sheet would pass into the bite of the conical rolls K, (tucker L being removed,) and the latter rolls in that event would act simply to turn the paper and present it in proper position to be acted on by the subsequent folding devices. In this case the axes of all the rolls would still be horizontal and parallel, thus obviating the necessity of using rolls at right angles to one another, as required under the prevailing methods heretofore in use.

What we claim, therefore, and desire to secure by Letters Patent, is—

1. In a folding-machine, the combination, substantially as hereinbefore set forth, of conical folding and feeding rolls, arranged and operating to carry along the paper faster at one side than at the other, thereby partially turning the sheet, so that when the fold is completed what were the front and rear edges will have become the side edges of the sheet, as described, and means, substantially as described, for tucking the paper to be folded into the bite of said rolls.

2. The combination of a vibratory tucker-blade and conical folding-rolls, arranged and operating to carry along the paper faster at one side than at the other, thereby partially turning the sheet, so that when the fold is completed what were the front and rear edges will have become the side edges of the sheet, substantially as hereinbefore set forth.

3. In combination, with the endless power-driven tapes and transverse clamp-bars, the vibratory nippers or jaws, mounted independently of one another, one at each end of each clamp-bar, so as to vibrate in a plane transverse to the line of movement of the bar, adjustable to and from each other, and arranged and operated, as shown and described, to close and open at stated intervals, as and for the purposes hereinbefore set forth.

4. In combination with the tapes and the transverse clamp-bar carried by the same, the vibratory jaws, each hung on a pivot, $b$, adjustable in the clamp-bar, the laterally-projecting slide-rods $d$, provided with pins $c$, adjustable thereon, the springs $e$, and cams $d'$, substantially as and for the purposes shown and set forth.

5. In machinery for folding paper and other material, the combination, with folding mechanism, of conical rolls which receive and partially turn the sheet before presenting it to the said folding mechanism, substantially as hereinbefore set forth.

In testimony whereof we have hereunto set our hands this 3d day of February, 1881.

WILLIAM C. CROSS.
EDGAR B. STOCKING.

Witnesses:
E. A. DICK,
N. C. LANE.